(12) United States Patent
Oron

(10) Patent No.: US 10,062,020 B2
(45) Date of Patent: Aug. 28, 2018

(54) GENERATING RAISED PRINT DATA

(71) Applicant: HP INDIGO B.V., Amstelveen (NL)

(72) Inventor: Gadi Oron, Rehovot (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/024,967

(22) PCT Filed: Sep. 26, 2013

(86) PCT No.: PCT/EP2013/070095
§ 371 (c)(1),
(2) Date: Mar. 25, 2016

(87) PCT Pub. No.: WO2015/043639
PCT Pub. Date: Apr. 2, 2015

(65) Prior Publication Data
US 2016/0224874 A1    Aug. 4, 2016

(51) Int. Cl.
*G06K 15/02* (2006.01)
*G06K 9/00* (2006.01)
*G06F 3/12* (2006.01)
*B41J 3/407* (2006.01)

(52) U.S. Cl.
CPC .......... *G06K 15/1848* (2013.01); *B41J 3/407* (2013.01); *G06F 3/1204* (2013.01); *G06F 3/1208* (2013.01); *G06F 3/1247* (2013.01); *G06F 3/1254* (2013.01); *G06F 3/1285* (2013.01); *G06K 9/00228* (2013.01)

(58) Field of Classification Search
None
See application file for complete search history.

(56) References Cited

U.S. PATENT DOCUMENTS

| | | | |
|---|---|---|---|
| 3,924,019 A | 12/1975 | Jacob | |
| 8,061,791 B2 | 11/2011 | Iftime et al. | |
| 8,064,788 B2 | 11/2011 | Zaretsky et al. | |
| 8,355,597 B2 * | 1/2013 | Fukutomi | H04N 5/205 348/234 |
| 2001/0055130 A1 * | 12/2001 | Geurts | G06K 15/02 358/530 |
| 2006/0198679 A1 | 9/2006 | Tanaka et al. | |
| 2007/0139668 A1 * | 6/2007 | Wen | G06K 15/02 358/1.9 |
| 2007/0183658 A1 * | 8/2007 | Kobayashi | G06K 9/00228 382/162 |
| 2008/0056607 A1 * | 3/2008 | Ovsiannikov | H04N 5/217 382/275 |
| 2009/0291274 A1 | 11/2009 | Tyagi et al. | |

(Continued)

OTHER PUBLICATIONS

Way, T. et al.; "Towards Automatic Generation of Tactile Graphics"; Oct. 7, 2004; http://www.csc.villanova.edu/~tway/publications/wayresna96.pdf.

*Primary Examiner* — Helen Zong
(74) *Attorney, Agent, or Firm* — HP Inc. Patent Department

(57) ABSTRACT

According to one example, there is provided a method of processing content data representing content to be printed. The method comprises obtaining content data representing content to be printed, and generating raised print data from the content data, the raised print data representing areas of the content to be formed as raised print.

20 Claims, 6 Drawing Sheets

(56) References Cited

U.S. PATENT DOCUMENTS

| | | | |
|---|---|---|---|
| 2009/0303375 A1* | 12/2009 | Ohyama | H04N 5/23219 |
| | | | 348/333.12 |
| 2010/0055407 A1 | 3/2010 | Belelie et al. | |
| 2011/0013203 A1* | 1/2011 | Grosz | G06F 17/3028 |
| | | | 358/1.2 |
| 2011/0025842 A1* | 2/2011 | King | G06F 17/211 |
| | | | 348/135 |
| 2012/0086977 A1* | 4/2012 | Hotta | H04N 1/32325 |
| | | | 358/1.15 |
| 2012/0206742 A1 | 8/2012 | Palomo et al. | |
| 2012/0236129 A1* | 9/2012 | Yamaji | H04N 5/23219 |
| | | | 348/50 |
| 2014/0331876 A1 | 11/2014 | Shaul | |

\* cited by examiner

GENERATING RAISED PRINT DATA

BACKGROUND

Digital printing techniques enable high quality printed content to be produced in a fast and efficient manner.

In addition to visual content, some digital printing techniques are also capable of producing raised print, in which portions of the printed content are raised above the surface of a substrate on which the content is printed.

BRIEF DESCRIPTION

Examples, or embodiments, of the invention will now be described, by way of non-limiting example only, with reference to the accompanying drawings, in which.

DETAILED DESCRIPTION

Some digital printing technologies enable raised print to be formed in a simple and efficient way. For example, some of Hewlett-Packard's Indigo range of digital presses, which use a liquid electro-photographic (LEP) printing process, can produce raised print in a number of different ways. For example, some digital presses are able to produce raised print areas by printing multiple layers of print one on top of another and some digital presses are able to produce raised print areas through a digital embossing technique.

Raised print can also be produced using inkjet printing technologies. For example, printers that use ultra-violet (UV) curable inks can produce raised print areas by printing and curing multiple layers of ink on a substrate.

The term raised print used herein is used to refer to any portion of a printed product which is raised above the surface of a substrate on which content is printed, whether formed through substrate deformation techniques, such as embossing, the build-up of multiple layers of printing fluid such as ink, or through any other suitable technique or combination of techniques.

Generating raised print using digital printing techniques enables variable content raised prints to be produced as part of a digital printing workflow. In this way, a digital printing system can produce, for example, single copies of different printed content each with different raised print portions.

Raised print can add significant value to printed articles and enables print service providers to offer a differentiating value proposition. However, although the technology for generating raised print in digital printers exists, use of raised print has remained low.

One of the reasons for low use of raised print is that the generation of printed content comprising raised print requires data to be generated that defines the precise nature and location of the desired raised print to be produced. Such raised print data may be defined, for example, as an additional digital image layer, or colour separation, of a digital image file. Generating raised print data manually requires a skilled user and may be time-consuming to generate, especially for complex content.

Figure 1:
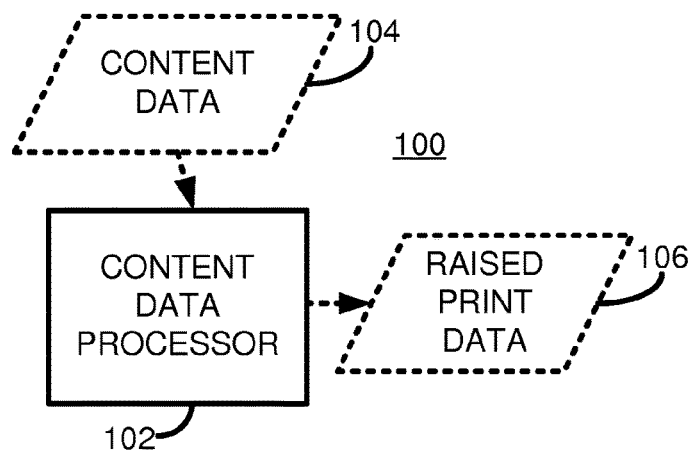
FIG. 1 shows a content data processor to generate raised print data automatically from content data, according to one example.

Referring now to FIG. 1, there is a shown a system 100 that comprises a content data processor 102. The content data processor 102 processes content data 104 representing content to be printed and generates therefrom raised print data 106. In one example raised print data may be generated in the form of an image or an image layer data, for example where pixels of one colour represent areas intended to correspond to raised print areas, and where pixels of a different colour represent areas intended to correspond to areas of no raised print.

The raised print data 106 is useable by a suitable printing device to generate printed content corresponding to the raised print data. In one example the printed content generated by a printing device comprises visible printed content corresponding to the visual content represented by the content data 104 together with raised print areas corresponding to the generated raised print data 106.

Operation of the content data processor 102, according to one example, will now be described with additional reference to the flow diagram of FIG. 2.

At block 202 the content data processor 102 obtains content data 104 representing content to be printed. As will be described in greater detail below, the content data 104 may represent any suitable content to be printed. For example, in one example the content data 104 may represent an image, such as a photograph, a drawing, etc. In another example the content data may represent a combination of images and text or numeric data. In other examples the content data 104 may represent other graphical content.

The content data 104 may be arranged in any suitable format, including as a bitmap image format, a compressed image format, a half-toned image format, etc.

The content data 104 may be obtained in any suitable way, for example, from a digital storage device, from a memory device, from a remote storage device, from a printer driver, from a raster image processor (RIP), etc.

In one example the content data processor 102 is a stand-alone processing system, such as a software application, that is used to process previously prepared content to be printed. In another example the content data processor 102 is integrated into a content generation application, such as an image processing software application or a document generation system. In a yet further example the content data processor 102 is integrated into a raster image processor (RIP). In a still further example the content data processor 102 is integrated into a printer. In a further example the content data processor 102 is integrated into a printer driver.

At block 204 the content data processor 102 processes the obtained content data 104 and generates raised print data 106 therefrom. The generated raised print data 106 is usable by a suitable printing system to generate printed content having raised print in an area or areas defined by the raised print data 106.

In one example the generated raised print data 106 may be kept separate from the content data 104. In another example the generated raised print data 106 may be combined with the content data 104 to form modified content data. In one example the content data 104 and raised print data 106 is combined in a single image file. For example, if the content data 104 describes different colour separations, the generated raised print data may be integrated with the content data 104 as a supplementary colour separation defining the raised print to be generated. In a further example the generated raised print data may be integrated with the content data 104 as multiple supplementary colour separations.

In one example raised print generated by a printing system may have a predetermined height and may, for example, be substantially constant for any printed content generated by the given printing system. In such cases, any raised print areas defined by the raised print data 106 will be printed with a predetermined height.

In other examples, it is possible to generate raised print data 106 that is suitable to cause a suitable printing system to generate printed content having raised print of different heights. For example, the content data processor 102 may, in one example, determine different areas of an image to have different raised print heights. In such a system, the content data processor may generate multiple layers of raised print data 106, with each layer of raised print data 106 causing a printing device to produce raised print of a predetermined height.

In a yet further example, the content data processor may define a specific height for each raised print area to be produced. When used with a suitable printing system the specific height of raised print may be generated by the printing system in accordance with the generated raised print data 106.

Figure 3:
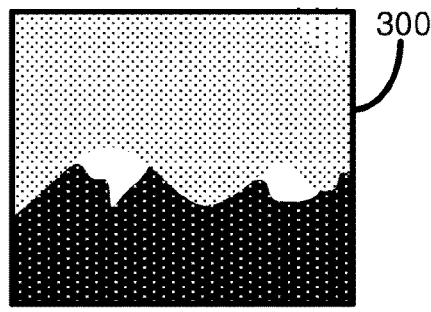
FIG. 3 shows an example image.

Referring now to FIG. 3, there is shown an example image 300. For the purposes of illustration the image 300 is an image representing a simplified mountain scene. However, the techniques and methods described herein are suitable for any kind of image, including high-resolution photographic images.

At block 202 the content data processor 102 obtains data representing the image 300.

Figure 4:
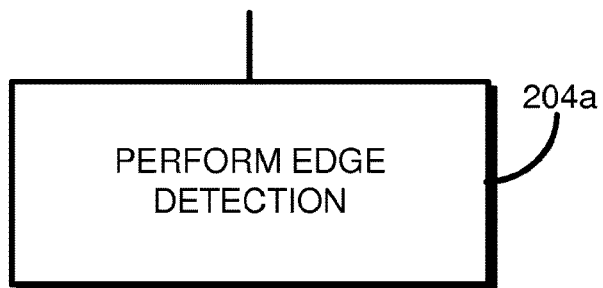
FIG. 4 is a flow diagram outlining example operations performed by a content data processor, according to one example.

At block 204 the content data processor 102 processes the image data to generate raised print data corresponding to one or multiple portions of the image. In one example, as illustrated in FIG. 4, the content data processor 102 performs edge detection (block 204a) on the image 300 in order to identify one or multiple edges within the image 300. The edge detection algorithms used may be any suitable algorithms or combination of algorithms, including, for example, the Canny edge detection algorithm.

Figure 5:
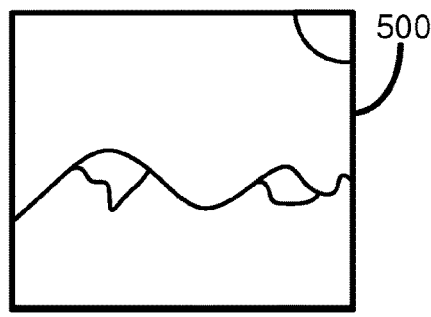
FIG. 5 shows an example image in which edges have been detected, according to one example.

An example image 500 resulting from performing edge detection on the image 300 is shown in FIG. 5. The image 500 is a monochrome image where detected edges are shown in black, whilst the background is shown in white.

In one example the content data processor 102 generates raised print data 106 directly from the edge detected image, such as the image 500 shown in FIG. 5. For example, the content data processor 102 may convert the image 500 directly into raised print data. In one example a monochrome image is generated where white pixels represent areas to be generated as raised print, and black pixels represent non-raised print areas.

In another example the content data processor 102 may further process the image 500, for example by widening or narrowing some or all of the detected edges to be within a predetermined width range prior to converting the image 500 into raised print data. In a further example the content data processor may process the image 500 and may identify one or areas to be produced as raised print.

In another example the content data processor 102 may determine a desired height of the raised print and may generate one or multiple layers of raised print data, with each layer of raised print data corresponding to raised print of a predetermined height, as described above.

Figure 6:
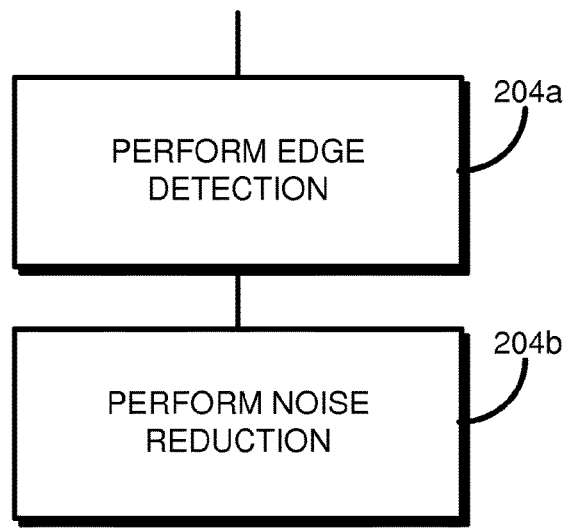
FIG. 6 is a flow diagram outlining example operations performed by a content data processor, according to one example.

In a yet further example, as shown in FIG. 6, the content data processor 102 may perform (block 204b, FIG. 6) noise reduction, using any suitable noise reduction techniques, on the detected edge data to remove edges below a certain threshold level. Example noise reduction techniques include filtering, pixel averaging, and anisotropic diffusion, to name just a few. For example, such a noise reduction algorithm may be used to remove unwanted edges detected on certain elements of an image, such as grass, sky, water, etc. In one example noise reduction may be performed after edge detection has been performed. In other examples noise reduction may be performed before edge detection has been performed. In other examples noise reduction may be performed both before and after edge detection has been performed.

Figure 7:
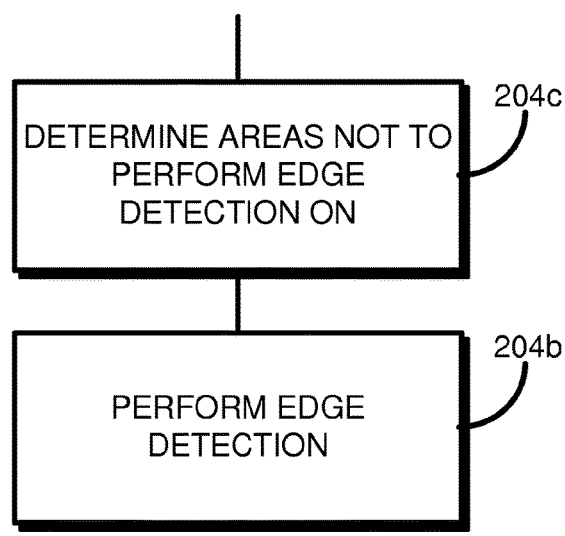
FIG. 7 is a flow diagram outlining example operations performed by a content data processor, according to one example.

In a still further example, as shown in FIG. 7, the content data processor 102 may determine (block 204c) one or multiple areas of an image on which edge detection is not to be performed.

For example, experience has shown that users generally prefer that no raised print be generated on people's faces. Accordingly, in one example the content data processor 102 performs (block 204c) a suitable facial detection technique on the image to be processed. An example of facial detection techniques can be found in the widely available OpenCV library of programming functions. If any faces are detected in the image the content data processor 102 identifies their positions within the image and does not perform edge detection on the detected faces or in the region of any detected face. Any suitable facial detection algorithm may be used by the content data processor 102.

In another example, the content data processor 102 may detect the presence of alphanumerical characters within an image and identify these areas of the image as areas in which no edge detection is to be performed.

Advantageously, use of the systems and methods described herein enable raised print image to be produced in a simple and efficient manner, without requiring labour-intensive manual preparation of raised print data.

Figure 8:
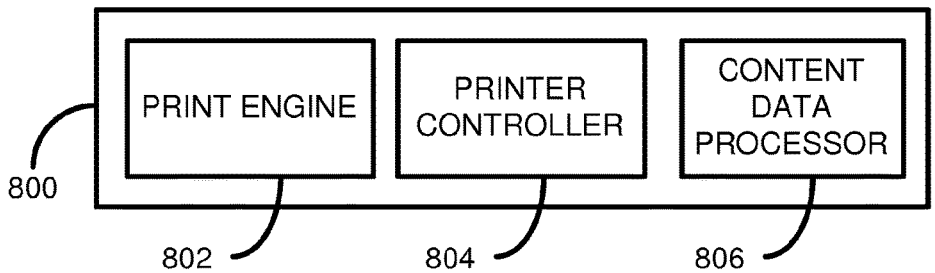
FIG. 8 is a block diagram of a printer in which a content data processor is incorporated, according to one example.

FIG. 8 shows a simplified block diagram of a printing system 800. The printing system 800 comprises a print engine 802 for producing printed content in accordance with content data and for additionally producing raised print in accordance with raised print data. The printing system 800 further comprises a printer controller 804 for generally controlling the operation of the printing system 800. The printing system 800 further comprises a content data processor 806, as described herein, for producing raised print data from obtained content data.

Figure 9:
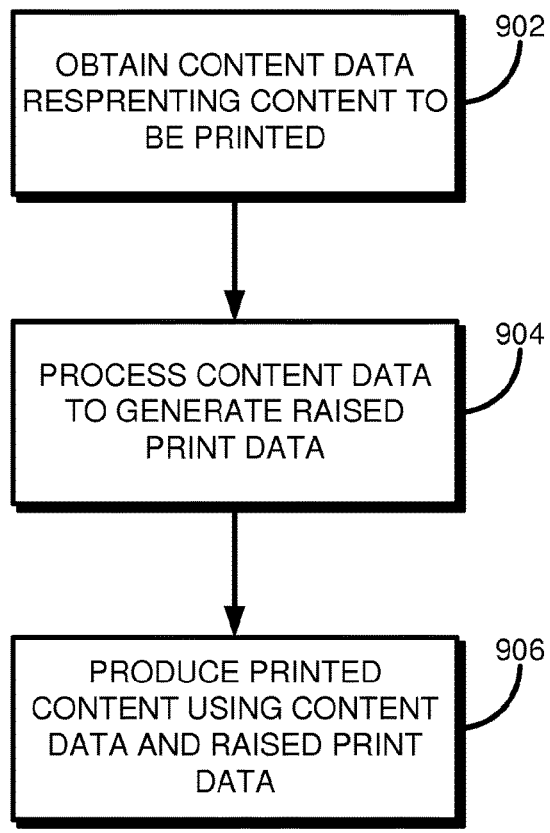
FIG. 9 is a flow diagram outlining example operations performed by a printer according to one example.

As illustrated in FIG. 9, the content data processor 806 obtains (block 902) content data representing content to be printed and processes (block 904) the content data to generate raised print data. Under control of the printer controller 804 the obtained content data and generated raised print data are passed to the print engine 802 where the printed content and corresponding raised print is produced by the printing system 800.

Figure 10:
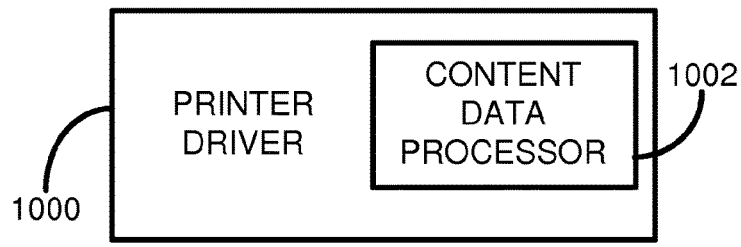
FIG. 10 is a block diagram of a printer driver in which a content data processor is incorporated, according to one example.
Figure 11:
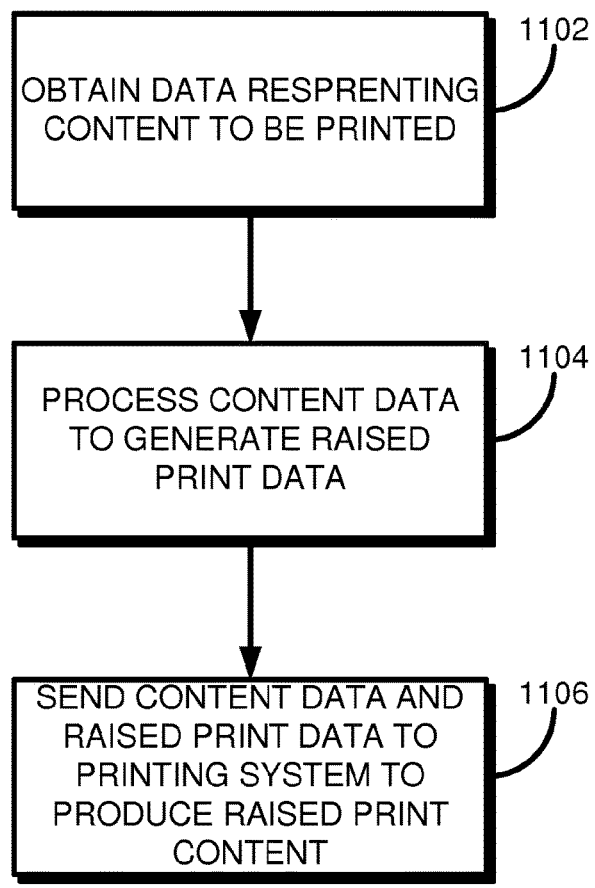
FIG. 11 is a flow diagram outlining example operations performed by a printer driver according to one example.

FIG. 10 illustrates a block diagram of a printer driver 1000 incorporating a content data processor 1002 as described herein. The printer driver 1000 enables a user to select to generate raised print data, for example by having the user select a relevant option through a user interface of the printer driver. As shown in FIG. 11 the printer driver 1000 obtains (block 1102) content data representing content to be printed, processes (block 1104) the content data to generate raised print data, and sends (block 1106) the content data and raised print data to a suitable printing system to produce the raised print content.

As can be seen incorporating a content data processor as described herein into a printing system or a printer driver makes the production of raised print content particularly easy for users to achieve.

Figure 12:
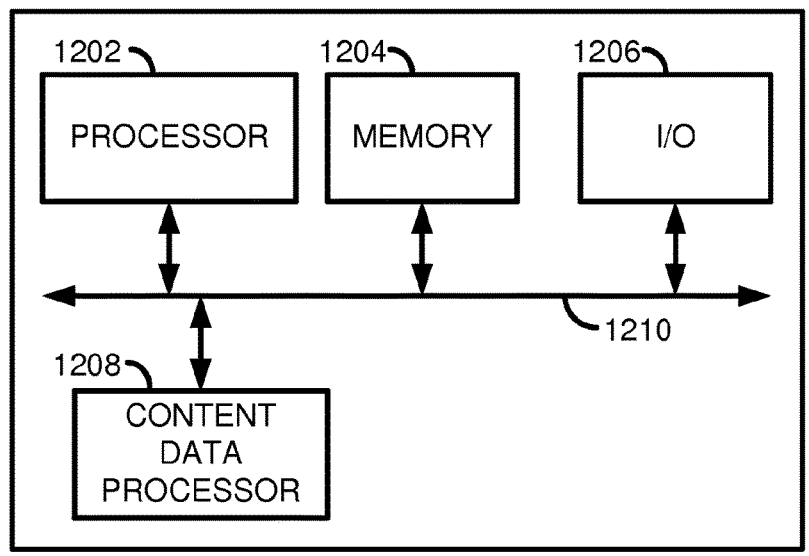
FIG. 12 is a block diagram of a content data processor according to one example.

FIG. 12 is an example block diagram of a content data processor system 1200 according to one example. The content data processor system 1200 comprises a processor 1202, a memory 1204, an input/output (I/O) module 1206, and a content data processor module 1208 application module, all coupled together on bus 1210. In some examples the content data processor module 1208 may also have a user interface module, an input device, and the like, but these items are not shown for clarity. The processor 1202 may comprise a central processing unit (CPU), a micro-processor, an application specific integrated circuit (ASIC), or a combination of these devices. The memory 1204 may comprise volatile memory, non-volatile memory, and a storage device. The memory 1204 is a non-transitory computer readable medium. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

The I/O module 1206 may be used, for example, to couple the content data processor 1008 to other devices, for example the Internet or a computer. The content data processor 1208 has code, typically called firmware, stored in the memory 1204. The firmware is stored as computer readable instructions in the non-transitory computer readable medium (i.e. the memory 1204). The processor 1202 generally retrieves and executes the instructions stored in the non-transitory computer-readable medium to operate the system and to execute functions described herein. In one example, processor executes code that causes printed content having raised print to be produced, as described herein.

Figure 13:
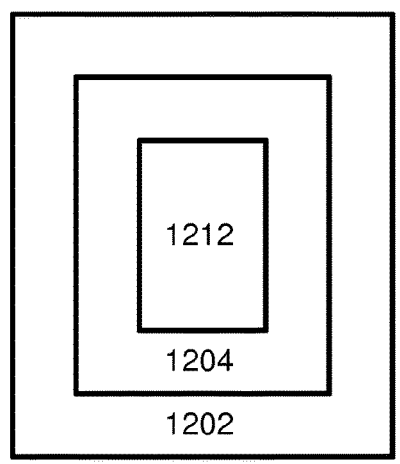
FIG. 13 is a block diagram of a processor couple to a memory according to one example.

FIG. 13 is an example block diagram of the processor 1202 coupled to memory 1204. Memory 1204 contains software 1212 (also known as firmware). The software 1212 contains a content data processor module that when executed by the processor 1202 causes the content data processor module 1208 to process content data and generate raised print data as described herein.

It will be appreciated that examples described herein can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method of processing content data representing content to be printed, comprising:
    obtaining content data representing content to be printed;
    determining edges of the content data;
    determining a first subset of the edges for which edge detection is to be performed and a second subset of edges for which edge detection is to be avoided;
    performing edge detection on the first subset of the edges to generate an edge detected image;
    widen detected edges to be within a predetermined width range;
    convert the edge detected image into raised print data by:
    determining different areas of the content data to have different raised print heights; and
    generating layers of raised print data, wherein each layer of raised print data corresponds to raised print of a predetermined height; and
    producing printed content based on the raised print data and content data, wherein the raised print data is formatted for a printing system as a number of supplementary color separations.

2. The method of claim 1, wherein the generated raised print data is useable by a suitable printing device to generate printed content including raised print corresponding to the raised print data.

3. The method of claim 1, wherein combining in a single image file the generated raised print data with the obtained content data further comprises including the raised print data in the single image file as a number of supplementary color separations.

4. The method of claim 1, further comprising generating printed content based on the obtained content data and the generated raised print data.

5. The method of claim 1, wherein generating the raised print data comprises performing edge detecting on the content data.

6. The method of claim 5, wherein generating the raised print data further comprises performing noise reduction on the raised print data.

7. The method of claim 1, further performing face detection on the content data to identify an area containing a face, wherein generating raised print data does not generate raised print data from areas identified to contain a face.

8. The method of claim 5, further comprising performing noise reduction both before and after performing edge detection.

9. The method of claim 5, further comprising performing noise reduction before performing edge detection.

10. The method of claim 5 further comprising adjusting a width of a detected edge in the raised print data.

11. The method of claim 5 further comprising not performing the edge detection in areas of the content comprising alphanumeric characters.

12. The method of claim 1, wherein:
pixels of a first color represent areas of the content to be formed as raised print areas; and
pixels of a second color represent areas of the content not to be formed as raised print areas.

13. The method of claim 1, wherein the raised print data comprises multiple layers, each layer of the multiple layers of raised print data corresponding to raised print of a predetermined height.

14. A printer driver, comprising instructions on a non-transitory computer readable medium that, when executed, cause a processor to:
obtain content data;
determine edges of the content data;
determine a first subset of the edges for which edge detection is to be performed and a second subset of the edges for which edge detection is to be avoided;
perform edge detection on the first subset of the edges to generate an edge detected image;
widen detected edges to be within a predetermined width range;
convert the edge detected image into raised print data by:
determining different areas of the content data to have different raised print heights; and
generating layers of raised print data, wherein each layer of raised print data corresponds to raised print of a predetermined height; and
send the content data and generated raised print data to a printing system, wherein the raised print data is formatted for the printing system as a number of supplementary color separations.

15. The printer driver of claim 14, wherein the content data processor performs face detection on the content data and wherein the content data processor does not generate raised print data in the region of any detected faces.

16. The printer driver of claim 14, further comprising modifying the obtained content data to include the generated raised print data and sending the modified content data to the printing system.

17. The printer driver of claim 14, wherein the content data processor generates raised print data in response to a raised print option being selected by a user through a user interface of the printer driver.

18. A printing system, comprising:
a content data processor to:
obtain content data representing content to be printed;
perform edge detection on the content data to generate an edge detected image;
change a width of a detected edge in the content data;
convert the edge detected image into raised print data by:
determining different areas of the content data to have different raised print heights; and
generating layers of raised print data, wherein each layer of raised print data corresponds to raised print of a predetermined height; and
a printer controller to control a print engine of the printing system to produce printed content having raised print, the printed content corresponding to the obtained content data and the raised print corresponding to the generated raised print data.

19. The printing system of claim 18, the content data processor to format the raised print data as a number of supplementary color separations for the print engine.

20. The printing system of claim 18 wherein the content data processor determines areas of an image represented by the content data on which edge detection is not to be performed.

* * * * *

UNITED STATES PATENT AND TRADEMARK OFFICE
CERTIFICATE OF CORRECTION

PATENT NO. : 10,062,020 B2
APPLICATION NO. : 15/024967
DATED : August 28, 2018
INVENTOR(S) : Gadi Oron Page 1 of 1

It is certified that error appears in the above-identified patent and that said Letters Patent is hereby corrected as shown below:

In the Drawings

Figure 2:
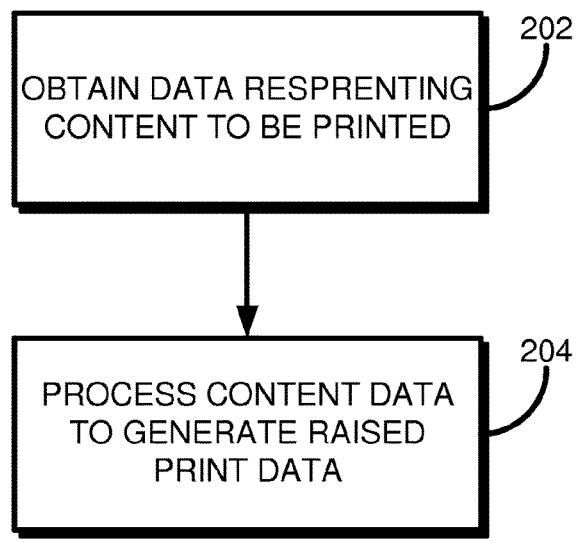
FIG. 2 is a flow diagram outlining example operations performed by a content data processor, according to one example.

In sheet 1 of 6, FIG. 2, reference numeral 202, Line 1, delete "RESPRENTING" and insert -- REPRESENTING --, therefor.

In sheet 4 of 6, FIG. 9, reference numeral 902, Line 2, delete "RESPRENTING" and insert -- REPRESENTING --, therefor.

In sheet 5 of 6, FIG. 11, reference numeral 1102, Line 1, delete "RESPRENTING" and insert -- REPRESENTING --, therefor.

Signed and Sealed this
Fifth Day of February, 2019

Andrei Iancu
*Director of the United States Patent and Trademark Office*